(12) United States Patent
Bokusky et al.

(10) Patent No.: US 8,760,103 B2
(45) Date of Patent: Jun. 24, 2014

(54) ACTUATOR POWER CONTROL CIRCUIT HAVING FAIL-SAFE BYPASS SWITCHING

(75) Inventors: Mark David Bokusky, Eden Prairie, MN (US); Robert Sibilski, Ramsey, MN (US); Liliana Jasiczek, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 362 days.

(21) Appl. No.: 13/250,889

(22) Filed: Sep. 30, 2011

(65) Prior Publication Data

US 2013/0082634 A1   Apr. 4, 2013

(51) Int. Cl.
G05B 9/02        (2006.01)

(52) U.S. Cl.
USPC ........................................................ 318/563

(58) Field of Classification Search
USPC ............... 318/563, 810, 400.09, 494; 361/49; 363/21.15
See application file for complete search history.

(56) References Cited

U.S. PATENT DOCUMENTS

| | | |
|---|---|---|
| 3,829,848 A | 8/1974 | Eickelberg et al. |
| 4,129,847 A | 12/1978 | Teichert |
| 4,302,931 A | 12/1981 | White et al. |
| 4,628,268 A | 12/1986 | Matsubara |
| 4,652,417 A | 3/1987 | Sutherland et al. |
| 4,673,920 A | 6/1987 | Ferguson et al. |
| 4,688,183 A | 8/1987 | Carll et al. |
| 4,742,475 A | 5/1988 | Kaiser et al. |
| 4,854,852 A | 8/1989 | Patton et al. |
| 5,025,206 A | 6/1991 | Germer et al. |
| 5,081,405 A | 1/1992 | Nelson |
| 5,153,493 A | 10/1992 | Jornod et al. |
| 5,159,534 A | 10/1992 | Hudson et al. |
| 5,180,959 A | 1/1993 | Christopher |
| 5,318,516 A | 6/1994 | Cosmescu |
| 5,416,781 A | 5/1995 | Ruiz |
| 5,422,553 A | 6/1995 | MacLennan et al. |
| 5,431,182 A | 7/1995 | Brown |

(Continued)

FOREIGN PATENT DOCUMENTS

| | | |
|---|---|---|
| DE | 202004011803 | 12/2004 |
| EP | 0511828 | 11/1992 |

(Continued)

OTHER PUBLICATIONS

"555 Timer IC," Wikipedia, the Free Encyclopedia, 9 pages, Aug. 7, 2012.

(Continued)

*Primary Examiner* — Karen Masih
(74) *Attorney, Agent, or Firm* — Seager, Tufte, Wickhem LLC

(57) ABSTRACT

A system for controlling power to actuators. For example, a controller may output a signal having a variable duty cycle waveform for controlling current to an actuator via an interface circuit between the controller and the actuator. Changing the duty cycle may change the amount of current to the actuator. The controller may provide a control signal that optimizes power consumption by the actuator for efficiency purposes. However, if the controller fails, then no control signal may be available to allow current to the actuator, particularly in situations where the actuator may need to be operationally tested. To avoid such situations, fail-safe bypass switching may be incorporated into the interface circuit. Upon absence of a control signal from the controller, the circuit may provide a default signal in lieu of the control signal to maintain current to the actuator.

19 Claims, 14 Drawing Sheets

(56) References Cited

U.S. PATENT DOCUMENTS

| | | | |
|---|---|---|---|
| 5,446,677 A | 8/1995 | Jensen et al. | |
| 5,454,273 A | 10/1995 | Smith | |
| 5,465,031 A | 11/1995 | Nilssen | |
| 5,584,319 A | 12/1996 | Cholin | |
| 5,621,398 A | 4/1997 | Blair et al. | |
| 5,682,329 A | 10/1997 | Seem et al. | |
| 5,711,480 A | 1/1998 | Zepke et al. | |
| 5,848,609 A | 12/1998 | Marchesseault et al. | |
| 6,025,788 A | 2/2000 | Diduck | |
| 6,035,878 A | 3/2000 | Adams et al. | |
| 6,051,948 A | 4/2000 | Vepy | |
| 6,059,046 A | 5/2000 | Lowry | |
| 6,178,997 B1 | 1/2001 | Adams et al. | |
| 6,249,100 B1 | 6/2001 | Lange | |
| 6,431,203 B1 | 8/2002 | Zhu et al. | |
| 6,431,231 B1 | 8/2002 | Zhu et al. | |
| 6,443,422 B1 | 9/2002 | Gluf, Jr. | |
| 6,838,988 B2 | 1/2005 | Lennartz et al. | |
| 6,851,620 B2 | 2/2005 | Hill | |
| 6,915,171 B2 | 7/2005 | Mayer | |
| 6,922,123 B2 | 7/2005 | Lalonde et al. | |
| 6,954,044 B2 | 10/2005 | McMillan et al. | |
| 6,979,965 B2 | 12/2005 | McMillan et al. | |
| 7,021,072 B2 | 4/2006 | McMillan et al. | |
| 7,031,880 B1 | 4/2006 | Seem et al. | |
| 7,033,268 B2 | 4/2006 | Caliendo et al. | |
| 7,058,542 B2 | 6/2006 | Hauhia et al. | |
| 7,066,273 B2 | 6/2006 | Tan | |
| 7,079,831 B2 | 7/2006 | Schwartzman et al. | |
| 7,188,481 B2 | 3/2007 | DeYoe et al. | |
| 7,241,218 B2 | 7/2007 | Van Becelaere et al. | |
| 7,265,512 B2 | 9/2007 | McMillan et al. | |
| 7,378,980 B2 | 5/2008 | McFarland | |
| 7,401,541 B2 | 7/2008 | McCarroll et al. | |
| 7,442,068 B2 | 10/2008 | Hammer et al. | |
| 7,446,494 B2 | 11/2008 | Grabinger et al. | |
| 7,451,759 B2 | 11/2008 | Weiss et al. | |
| 7,460,013 B1 | 12/2008 | Osborne et al. | |
| 7,476,988 B2 | 1/2009 | Mulhouse et al. | |
| 7,477,028 B2 | 1/2009 | Bokusky et al. | |
| 7,492,233 B2 | 2/2009 | Grabinger | |
| 7,525,266 B2 | 4/2009 | Bolusky et al. | |
| 7,557,549 B2 | 7/2009 | Underhill | |
| 7,586,279 B2 | 9/2009 | Theunissen et al. | |
| 7,622,828 B2 | 11/2009 | Grabinger et al. | |
| 7,633,393 B2 | 12/2009 | Bonne | |
| 7,636,613 B2 | 12/2009 | Borah et al. | |
| 7,639,127 B2 | 12/2009 | Kastli | |
| 7,653,459 B2 | 1/2010 | Pouchak et al. | |
| 7,664,573 B2 | 2/2010 | Ahmed | |
| 7,672,913 B2 | 3/2010 | Kaplan et al. | |
| 7,697,492 B2 | 4/2010 | Petite | |
| 7,784,291 B2 | 8/2010 | Butler et al. | |
| 7,787,994 B2 | 8/2010 | Wacker | |
| 7,798,170 B2 | 9/2010 | Hotz et al. | |
| 7,802,734 B2 | 9/2010 | Stanimirovic | |
| 7,831,338 B1 | 11/2010 | Haydu | |
| 7,840,311 B2 | 11/2010 | Grohman | |
| 7,852,765 B2 | 12/2010 | Neuman et al. | |
| 7,876,217 B2 | 1/2011 | Laackmann et al. | |
| 7,881,678 B2 | 2/2011 | Menden et al. | |
| 7,891,241 B2 | 2/2011 | McSheffrey et al. | |
| 7,944,672 B1 | 5/2011 | Chiang | |
| 7,966,438 B2 | 6/2011 | Punyko et al. | |
| 8,031,650 B2 | 10/2011 | Petite et al. | |
| 8,218,547 B2 | 7/2012 | Van Steen et al. | |
| 2003/0052180 A1 | 3/2003 | Huhn et al. | |
| 2004/0124797 A1 | 7/2004 | Takeuchi et al. | |
| 2005/0162792 A1* | 7/2005 | Wang et al. | 361/62 |
| 2007/0120664 A1 | 5/2007 | Bilbrey et al. | |
| 2007/0209610 A1* | 9/2007 | Bradley et al. | 123/41.29 |
| 2007/0226318 A1 | 9/2007 | Rydberg et al. | |
| 2008/0051024 A1 | 2/2008 | Caliendo et al. | |
| 2008/0244104 A1 | 10/2008 | Clemente | |
| 2008/0258253 A1 | 10/2008 | Fey et al. | |
| 2008/0316039 A1 | 12/2008 | White et al. | |
| 2009/0005917 A1 | 1/2009 | Hole | |
| 2009/0033513 A1 | 2/2009 | Salsbury et al. | |
| 2009/0082880 A1 | 3/2009 | Saunders | |
| 2009/0101725 A1 | 4/2009 | Dolan et al. | |
| 2010/0077254 A1 | 3/2010 | Erdmann et al. | |
| 2010/0102973 A1 | 4/2010 | Grohman et al. | |
| 2010/0106262 A1 | 4/2010 | Schreyer et al. | |
| 2010/0106836 A1 | 4/2010 | Schreyer et al. | |
| 2010/0109675 A1 | 5/2010 | Wong et al. | |
| 2010/0121613 A1 | 5/2010 | Rosca et al. | |
| 2010/0134934 A1* | 6/2010 | Matsubara et al. | 361/49 |
| 2010/0141243 A1 | 6/2010 | Divicino et al. | |
| 2010/0253270 A1 | 10/2010 | Kuster et al. | |
| 2011/0070904 A1 | 3/2011 | McFarland | |

FOREIGN PATENT DOCUMENTS

| | | |
|---|---|---|
| EP | 1170036 | 1/2002 |
| EP | 1901145 | 3/2008 |
| EP | 2241834 | 10/2010 |
| GB | 1172789 | 12/1969 |
| JP | 57086544 | 5/1982 |
| JP | 60091411 | 5/1985 |
| JP | 63257802 | 10/1988 |
| JP | 1215633 | 8/1989 |
| JP | 2009118155 | 5/2009 |
| WO | WO 2010000077 | 1/2010 |

OTHER PUBLICATIONS

Beckhoff New Automation Technology, "Application Note DK9222-0810-0035, I/O, Building Automation," 7 pages, Aug. 2010.
Belimo, "Belimo Gateway MP to Modbus RTU-UK24MOD," Product Information, 20 pages, Feb. 2010.
Belimo, "Damper Actuator Plug-In Description/Documentation #Tools-007-E_20.11.05," 11 pages, Nov. 20, 2005.
Belimo, "MP-Bus-Interface—for Belimo Damper Actuators," 16 pages, Oct. 2009.
Belimo, "Perfect for Each and Every Connection, Bus Integration of Actuators and Sensors in Heating, Ventilation, and Air Conditioning Systems," 10 pages, prior to Sep. 30, 2011.
Belimo, "Ring Bus Solution by Belimo, State of the Art System for Bus Integrated Fire Protection and Smoke Control," 6 pages, prior to Sep. 30, 2011.
U.S. Appl. No. 13/278,694, filed Oct. 21, 2011.
U.S. Appl. No. 13/291,928, filed Nov. 8, 2011.
U.S. Appl. No. 13/293,029, filed Nov. 9, 2011.
U.S. Appl. No. 13/293,041, filed Nov. 9, 2011.
U.S. Appl. No. 13/293,051, filed Nov. 9, 2011.
Delta Controls, "HVAC Application Controllers DVC-V322," Document Edition 2.0, 7 pages, Feb. 2005.
Distech Controls, "ECC-VAV/ECC-VVT easyCONTROLS LonMark Certified Application Specific Single Duct Variable Air Volume/Variable Volume Temperature Controllers," 5 pages, prior to Sep. 30, 2011.
Echelon, "LNS Plug-In Belimo," 1 page, 2011.
Honeywell, "3 Nm, 5 Nm Series Spring Return Direct Coupled Actuators, MS3103, MS3105, MS4103, MS4105, MS7403, MS7405, MS7503, MS7505, MS8103, MS8105," Installation Instructions, 12 pages, 2011.
Honeywell, "Advanced Control from a Unitary Controller," 8 pages, Mar. 2009.
Honeywell, "Jade Economizer Module (Model W7220)," Installation Instructions, 20 pages, 2010.
Honeywell, "ML4202, ML4302, ML4702, ML4802, ML8202, ML8302 Fast-Acting, Two-Position Actuators for Fire/Smoke Control Applications," Installation Instructions, 4 pages, 2005.
Honeywell, "S05, S10, S20 Series Spring Return Direct Coupled Actuators, MS4105, MS4110, MS4120, MS71XX, MS7505, MS7510, MS7520, MS8105, MS8110, MS8120," Product Data, 16 pages, 2008.
Johnson Controls Unitary Products, "YCCS Zone Bypass Damper Assembly," 6 pages, 2008.
Microchip Technology, Inc., "Using PWM to Generate Analog Output AN538," 2 pages, 1997.

(56) References Cited

OTHER PUBLICATIONS

Motorola, "Triacs Silicon Bidirectional Triode Thyristors," 2 pages, prior to Sep. 30, 2011.
MP-Bus Technology by Belimo, "MP-Bus Convenient and Secure Integration of Belimo Actuator Drives," 1 pages, prior to Sep. 30, 2011.
Noliac, "Noliac Acquires Piezo Actuator Drive Technology from Siemens," 2 pages, prior to Sep. 30, 2011.
On Semiconductor, "AND8054/D Designing RC Oscillator Circuits with Low Voltage Operational Amplifiers and Comparators for Precision Sensor Applications," 3 pages, Jul. 2001.
Siemens, "BACnet ATEC," Technical Specification Sheet Document No. 149-825, 4 pages, Apr. 9, 2010.
Siemens, "Siemens, BACnet VAV Actuator," Technical Specification Sheet Rev. AA, 5 pages, Jan. 2008.
Tridium, "Belimo and Tridium to Jointly Develop a Next Generation VAV Controller with Wireless Communications," 2 pages, May 15, 2008.
Wang et al., "Research on Reliability of a Hybrid Three-Redundant Electro-Mechanical Actuator," Proceedings of the 2009 IEEE International Conference on Mechatronics and Automation, Aug. 9-12, 2009.

* cited by examiner

ACTUATOR POWER CONTROL CIRCUIT HAVING FAIL-SAFE BYPASS SWITCHING

BACKGROUND

The present disclosure pertains to heating, ventilating and air conditioning systems, and particularly to actuators relating to such systems.

SUMMARY

The disclosure reveals a system for controlling power to actuators. For example, a controller may output a signal having a variable duty cycle waveform for controlling current to an actuator via an interface circuit between the controller and the actuator. Changing the duty cycle may change the amount of current to the actuator. The controller may provide a control signal that optimizes power consumption by the actuator for efficiency purposes. However, if the controller fails, then no control signal may be available to allow current to the actuator, particularly in situations where the actuator may need to be operationally tested. To avoid such situations, fail-safe bypass switching may be incorporated into the interface circuit. Upon absence of a control signal from the controller, the circuit may provide a default signal in lieu of the control signal to maintain current to the actuator.

DESCRIPTION

With actuators getting smaller and more sophisticated, the need for digital electronics or a microcontroller to control the actuator appears to have become more prevalent, if not a requirement. However on some actuators, the need to withstand extreme environmental conditions seems to remain a requirement. This may be especially the case for smoke and fire actuators, which need to be able to handle temperatures of 250 degrees F., 350 degrees F. or higher. This might pose an issue for digital electronics and microcontrollers because they are not necessarily rated to handle extreme environmental conditions. A designer may then be forced to de-rate the actuator and only allow up to a less stringent temperature or environmental extreme, or go to a virtually all analog solution and lose the many advantages of using digital electronics or microcontrollers. There presently is not necessarily a way to have an actuator that has the compactness, efficiency and sophistication of a digital microcontroller which also can handle extreme environmental conditions that are required in the field.

The present approach may solve the issue by having an analog failsafe bypass. The circuit of the present approach, which may consists of analog electronics that can handle the required temperature extremes, may activate when the digital microcontroller fails due to extreme environmental conditions.

The requirements for the actuator at the extreme environmental conditions may often not necessarily be the same for normal conditions. As an example, in the case of a smoke and fire actuator, an endurance requirement may be to open and close the actuator three times after being subjected to 350 degrees F. for 30 minutes. If the digital microcontroller fails, it may be acceptable if a great portion of the functionality is disabled as long as the present approach, incorporating the analog failsafe-bypass, is active and allows the actuator to perform its required task. The present approach may allow the actuator to utilize the advantages of using a digital microcontroller, while at the same time meet the high temperature requirement. The analog failsafe-bypass may keep the designer from having to add cost to the design by using high temperature rated microcontrollers, thus keeping costs down. Also, the designer does not necessarily need to design in costly features into the circuit structure that keep the temperature extremes away from the sensitive micro, such as temperature barriers, foam insulation or conformal coating.

A microcontroller may provide a waveform to a control circuit for controlling power to an actuator. With the analog failsafe-bypass, if the microcontroller circuit fails, then the analog bypass circuit may be enabled so that power can still be provided to the actuator motor, allowing the actuator to proceed with minimum functionality to pass test requirements.

Figure 1:
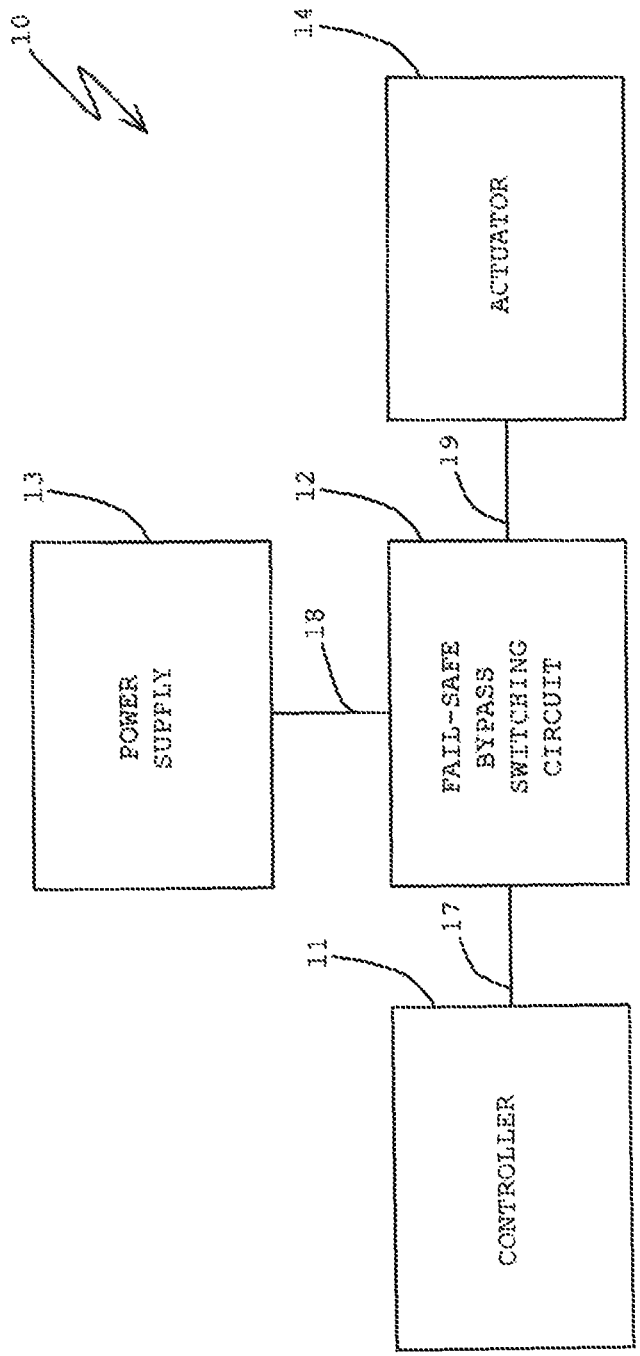
FIG. 1 is a block diagram of an actuator power control circuit having fail-safe bypass switching.
Figure 2:
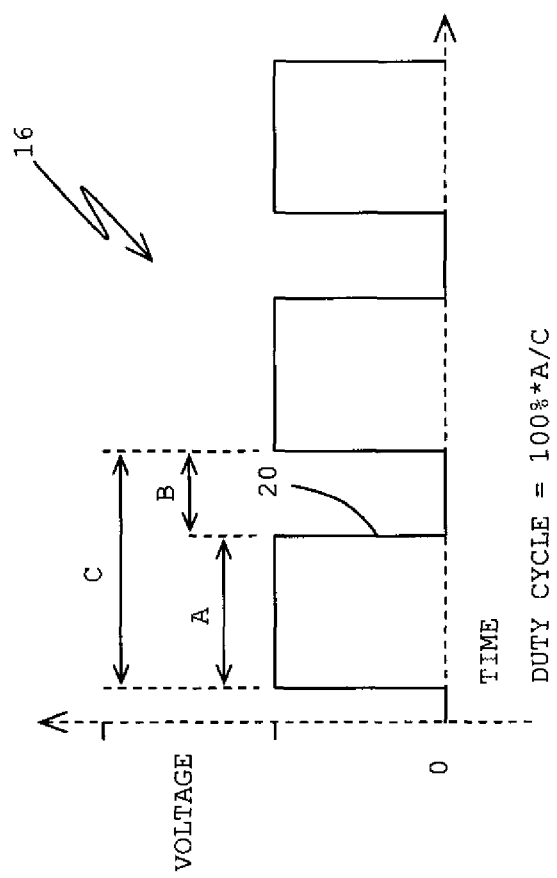
FIG. 2 is a diagram of a controller output waveform.

FIG. 1 is a diagram of a digital actuator with an analog fail-safe bypass system 10. A digital controller 11 may provide a square-wave signal with a duty cycle which may be varied. The duty cycle may normally range between 20 and 80 percent. The square-wave duty cycle control may be regarded as pulse width modulation (PWM). FIG. 2 is a diagram of a waveform 20 in a graph 16 of voltage versus time. The magnitude of the voltage may vary between zero and five volts. However, it may vary between other voltage levels. The cycle of the repetitive waveform 20 may be labeled as "C". A period of time that the waveform is at a high or higher voltage may be labeled as "A". The time that the voltage is at low or lower voltage may be labeled as B. The duty cycle in percentage of waveform 20 may be calculated as "A" divided by "C" multiplied by 100 for percent.

Figure 3:
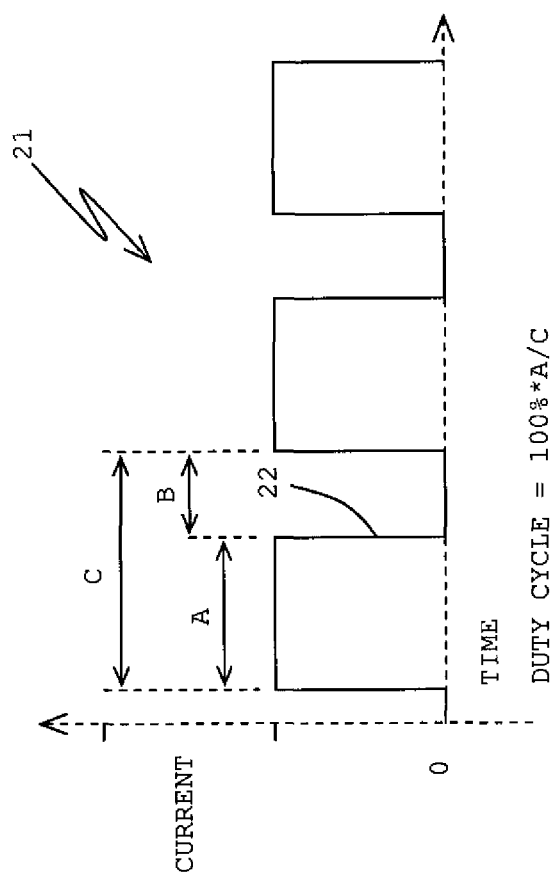
FIG. 3 is a diagram of a waveform of current to an actuator.

An output 17 of digital controller 11 may go to a fail-safe bypass switching circuit 12. Circuit 12 may receive a constant voltage level of power 18 from a power supply 13. The power 18 from supply 13 may eventually be provided to a motor of an actuator 14. Under normal operating conditions, power 18 may be conditioned as a power 19 having a waveform 22 of current to be applied to a winding of actuator 14. Waveform 22 may have a shape similar to that of waveform 20 in FIG. 2. An example of a waveform 22 is showing in a graph 21 in a diagram of FIG. 3. When output 17 from controller 11 at a high, as revealed by waveform 20, power 19 may then be provided to actuator 14. When output 17 from controller 11 is at a low, as revealed by waveform 20, then power 19 is not necessarily provided to actuator 14. The duty cycle of power 19 may generally track the duty cycle of output 17, as shown by waveforms 22 and 20, respectively, in FIGS. 2 and 3. Graph 21 of FIG. 3 may show current flow, as waveform 22, to actuator 14 versus time. An amount of current in graph 21 may be proportional to an amount of power 19 to actuator 14. So per unit time, for example, a cycle of waveform 20 of graph 16 for output 17, power 19 to actuator 14 may be varied according to the duty cycle of waveform 20 of output 17 from controller 11. More power 19 (i.e., larger duty cycle) may increase the torque and/or speed of the motor in actuator 14. Less power 19 (i.e., smaller duty cycle) may decrease the torque and/or speed of the motor in actuator 14. Controlling the duty cycle of waveform 20 in output 17 by controller 11 may depend on load requirements and desired speed of actuator 14. Such duty cycle control may lead to more efficient use of power 18, via power 19 having the duty cycle, for actuator 14.

However, output 17 with waveform 20 at the output of controller 11 may not necessarily exist at certain times. Such times may be those when controller 11 is malfunctioning due to environment conditions, e.g., high temperature, or other reasons including a failure of a component in controller or microcontroller 11. In case of such failure, no waveform 20 is provided to circuit 12. In the event of no waveform 20 because of a failure, output 17 of controller 11 may reflect high impedance to circuit 12. With high impedance "seen" in lieu of waveform 20 at the input of circuit 12, normal circuitry of circuit 12 would not necessarily permit power 19 from being output from circuit 12. In other words, no high level of input indicates that the circuit for power 19 would not turn on to permit power go to actuator 14. Thus, actuator 14 would be inoperable, particularly for any testing of the actuator.

Figure 4:
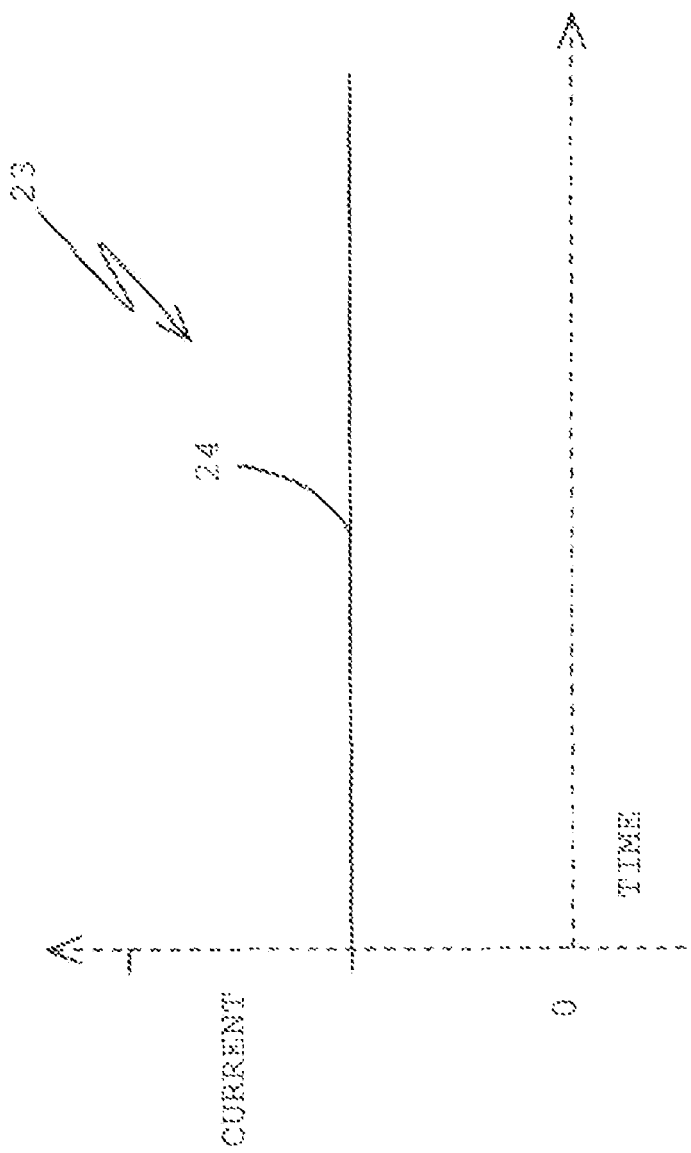
FIG. 4 is a diagram of an example of a fail-safe bypass waveform of current to the actuator.

However, circuit 12 may be made to incorporate a fail-safe bypass switching mechanism so as to circumvent issues arising from a failure of controller 11. If there is not an output from controller 11 due to its malfunction or failure, the fail-safe bypass mechanism may cause the switch (e.g., transistor) for controlling power 18 as power 19 to a motor of actuator 14, to provide power 19 virtually all of the time (i.e., 100 percent duty cycle) to actuator 14 or to provide a default waveform (i.e., less than a 100 percent duty cycle) for switching power 19. The waveform of power 19, in a case of a 100 percent duty cycle, would instead resemble a waveform 24 as shown in a graph 23 of FIG. 4. With a default waveform for switching power in circuit 12, the waveform of power 19 may have some resemblance to waveform 22 of graph 21.

FIGS. 5-14 are diagrams with schematic details of system 10 with various schemes of the fail-safe bypass switching schematic 31 of circuit 12. The resistor values may be very flexible. Virtually all of them may be about 10K ohms. However, the resistor values may be adjusted to optimize circuit performance.

Figure 5:
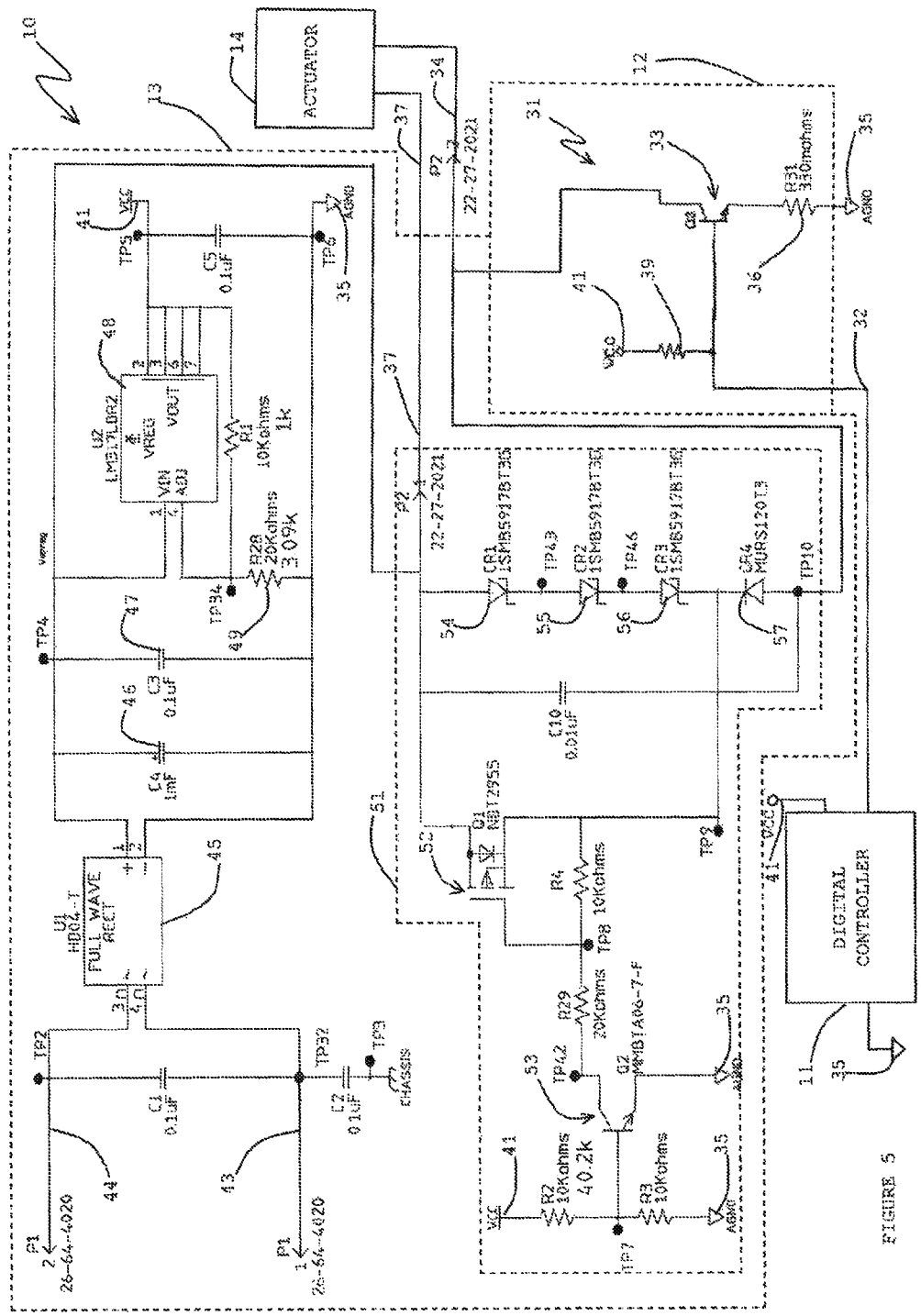
FIGS. 5-14 are diagrams with schematic details of the present system with various example schemes of the fail-safe bypass switching for the actuator control circuit.

In FIG. 5, if a high voltage signal (e.g., 5 volts) is provided along a line 32 to a base of an NPN bipolar transistor 33 having a collector connected to line 34 to actuator 14 and an emitter connected to a ground or a zero voltage reference terminal 35 via a low ohm resistor 36. Resistor 36 may, for instance, be about 0.33 ohm. Line 34 may be connected to a winding of a motor in actuator 14. The winding of the motor may also be connected to a line 37. In 37 of actuator 14 may be connected to positive unregulated voltage terminal of power supply 13. With the high voltage signal on line 32 to the base of transistor 33, and a significant positive voltage (e.g., 24 volts) applied to the collector relative to approximately zero volts on the emitter, transistor 33 may switch on and current may flow through transistor 33 from power source terminal 37 via the motor winding in actuator 14 and line 34 through the transistor via the collector and emitter and through resistor 36 to ground or voltage reference terminal 35. Power 19 merely needs to be sufficient for desirable operation of the motor of actuator 14.

If the voltage on line 32 is zero or approximately close to the voltage at terminal 35, then transistor 33 may switch off in that current flow through transistor 33 from the collector to emitter is effectively stopped. That means that the motor of actuator 14 may cease to operate because of a lack of sufficient current flow through the winding of the motor. Transistor 33 may switch current on and off in accordance with waveform 20 of FIG. 2 on line 32 to the base of transistor 33.

If digital controller 11 malfunctions and does not provide an output signal on line 32, the impedance at the controller output may be relatively high compared to its ordinary output impedance under normal operating conditions. In that situation, the base of transistor 33 may not have a voltage sufficiently high enough to turn on and conduct current through line 37, a motor winding of actuator 14, line 34, transistor 33 and resistor 36 to terminal 35. It may be noted that terminal 35 is connected to and at the same voltage as the other side of the output of power supply 13.

However, the lack of current flow through transistor 33 due to failure of controller 11 and its output on line 32 may be prevented with the fail-safe bypass circuit 31. A component, such as a resistor 39 may prevent the switching off of transistor 33 and stopping the current flow through various portions of the circuit such as the motor winding in actuator 14. Resistor 39 may have one end connected to the base of transistor 33 and the other end connected to a voltage that is sufficiently more positive than the voltage at the emitter of transistor 33. The other end of resistor 39 may be connected to a regulated voltage (VCC) terminal 41 of power supply 13. Resistor 39 may instead be connected to the unregulated voltage terminal 37 of supply 13. The resistance of resistor 39 may be sufficiently low enough (e.g., 10 k ohms) to provide a positive voltage on the base of transistor 33 so that current can flow freely from the collector to the emitter and maintain current through the motor winding of actuator 14. The current flow through the components in the current path described herein may be effectively the same as if controller 11 were operating satisfactorily and outputting a signal on line 32 having a waveform 20 with a 100 percent duty cycle; that is, "A" would be equal to "C" in graph 16 of FIG. 2.

Aspects of power supply 13 may be noted. Power supply 13 may be connected to ordinary line power such as a 60 cycle 110 volt supply at terminals 43 and 44. A full wave rectifier 45 may rectify the line power into D.C. on lines 35 and 37 which may be smoothed with capacitors 46 and 47 1 mF and 0.1 uF, respectively). The power on lines 35 and 37 may be regarded as unregulated voltage ($V_{unreg}$). Line 35 (via a resistor 49) and line 37 may be connected to a voltage regulator 48. An output of regulator 48 may be a regulated voltage to support various electronics of system 10 as represented in FIG. 1.

In parallel with the $V_{unreg}$ portion of power supply 13 at terminals 35 and 37 may be a circuit 51. Circuit 51 may be a part of power supply 13. In some examples of system 10, circuit 51 might not be in circuit 13 or the system. Transistors 52 and 53, along with associated resistors and a capacitor, and diodes 54, 55, 56 and 57 may operate together, with respect to the back EMF (electromotive force) motor of actuator 14, to control a spring return speed of actuator 14 when power to the actuator is removed or lost. Circuit values may be adjusted for a particular gear train at the output of the motor connected to an actuator arm and for a specific tension of the return spring of the actuator arm. Power supply 13 and circuit 51 may be illustrative examples of circuits which can be utilized with controller 11, actuator 14 and the respective fail-safe bypass switching circuit 12.

Figure 6:
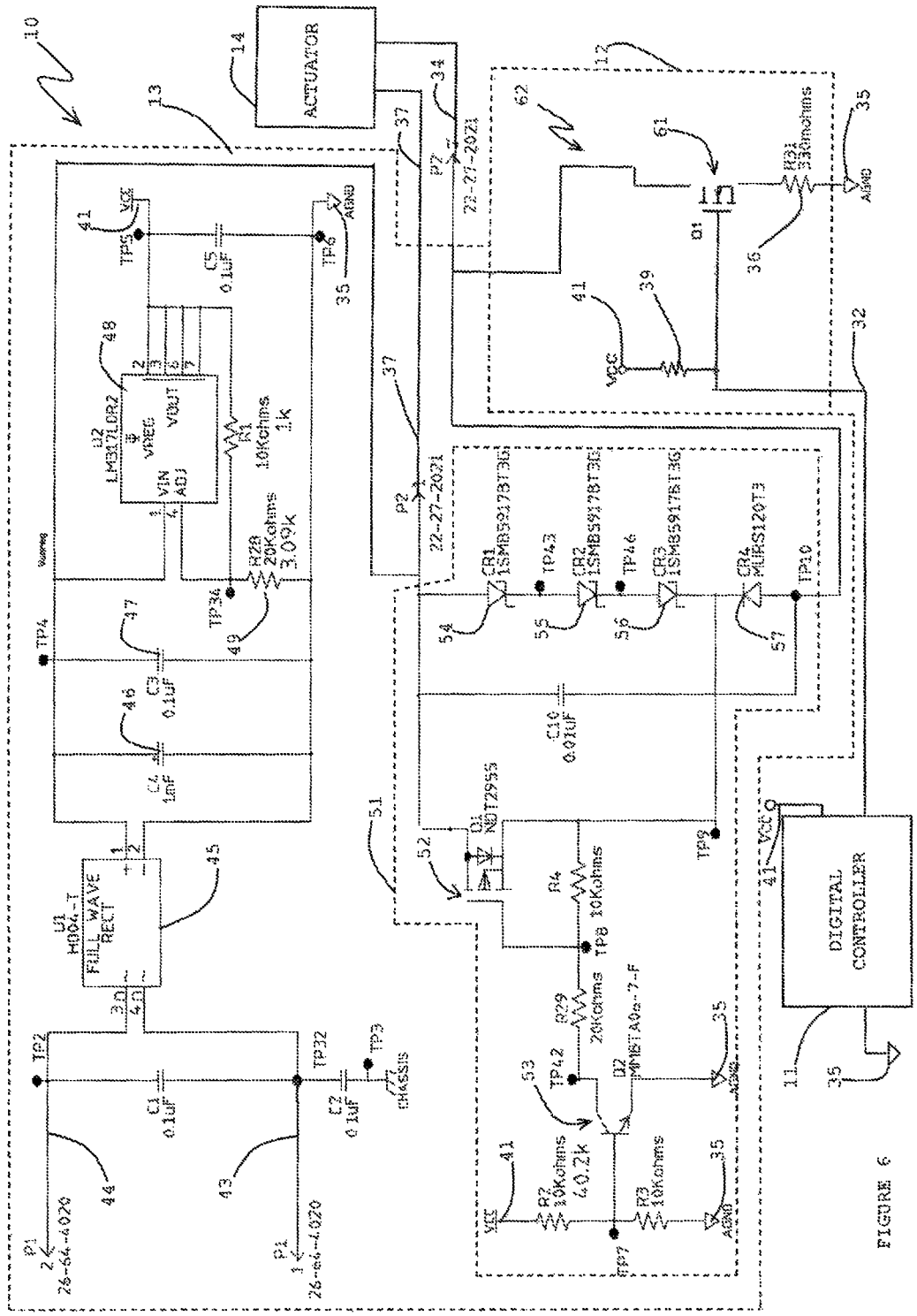

The schematics of FIGS. 5-14 appear similar relative to power supply 13 and circuit 51. FIG. 6 is a diagram that reveals system 10 having controller 11, fail-safe bypass switching circuit 12, power supply 13 and actuator 14.

Circuit 12 in the diagram of FIG. 6, may incorporate a fail-safe switching mechanism 62 to avoid issues which may occur due to a failure of controller 11. If there is no output from controller 11 due to a malfunction or failure then the fail-safe bypass switching mechanism 62 may cause a switch (e.g., transistor 61) for controlling power 18 to the motor of actuator 14, to provide power 19 virtually all of the time to the motor of actuator 14. If a high voltage signal (e.g., logic high) is provided along line 32 to a gate of an N-channel FET 61, having a drain connected to line 34 to actuator 14 and a source connected to ground terminal 35 via a 0.33 ohm resistor 36. With a logic high signal on line 32 to the gate, and a significant positive voltage applied to the drain relative to approximately zero volts at the source, FET 61 may switch on and current may flow through FET 61 from the power source terminal 37 via the motor winding in actuator 14 and line 34, and from FET 61 through resistor 36 to terminal 35. The magnitude of the current merely needs to be sufficient for desirable operation of the motor of actuator 14.

If the signal voltage on line 32 is approximately close to the voltage at terminal 35, then FET 61 may switch off in that current flow through the FET from the drain to the source is effectively stopped. That means that the motor of actuator 14 may cease to operate because of a lack of significant current flow through the winding of the motor. FET 61 may switch current on and off in accordance with waveform 20 in FIG. 2 appearing as the signal on line 32 to the gate of FET 61.

If digital controller 11 malfunctions and does not provide an output signal on line 32, the impedance at the output of controller 11 may be high, but the voltage at the gate of FET 61 may be low without a pull-up resistor 39 connected between the gate and voltage terminal 41. However, the resistor 39 arrangement may result in sufficient voltage on the gate to turn on FET 61 so that current flows through FET 61 from the power source terminal 37 via the motor winding in actuator 14 and line 34, and from FET 61 through resistor 36 to terminal 35.

Figure 7:
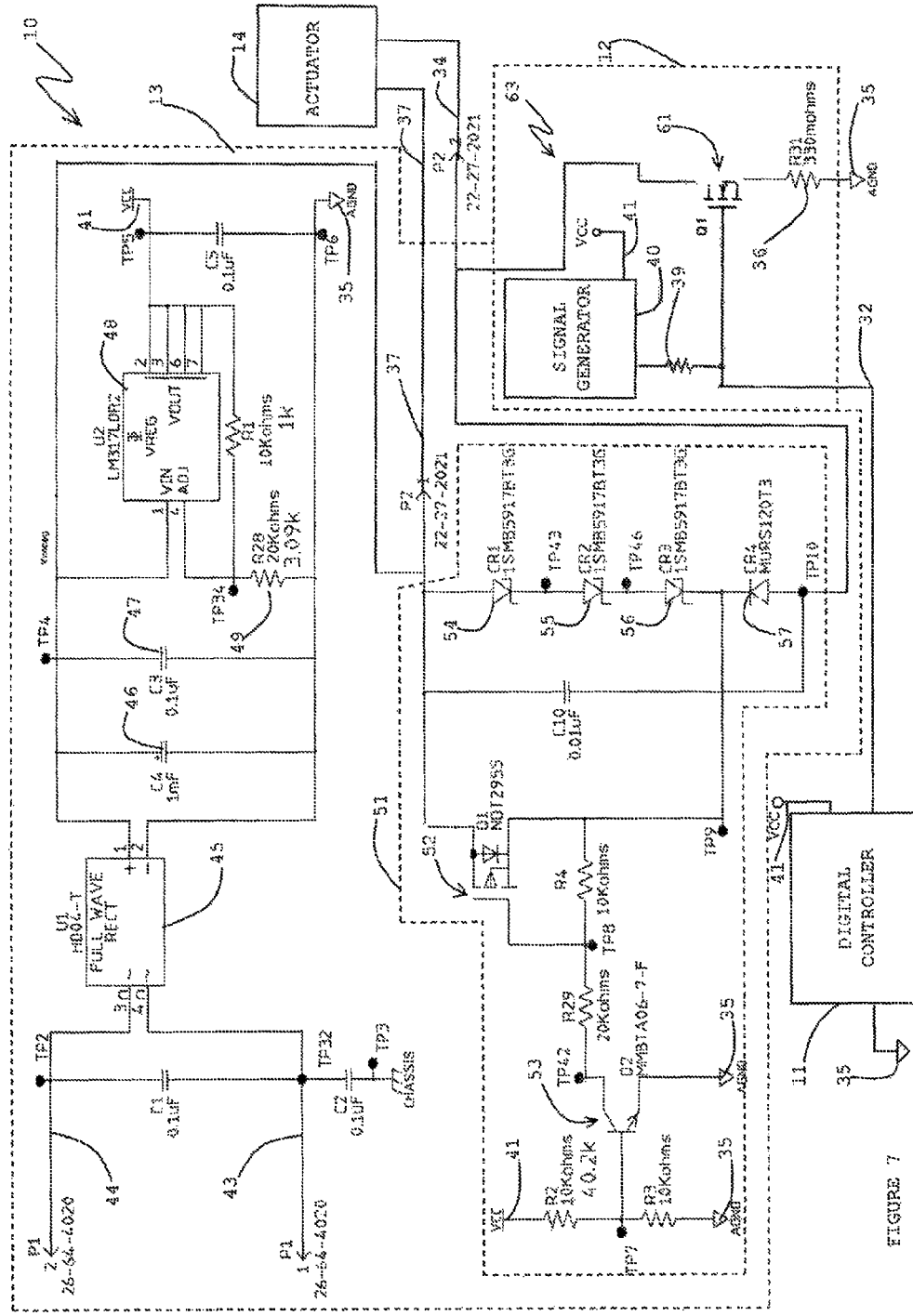

FIG. 7 appears similar to FIG. 6 except that circuit 12 may incorporate a fail-safe switching mechanism 63 to avoid issues which may occur due to failure of controller 11. If there is no signal on line 32, under normal circumstances FET 61 would not necessarily turn on to run actuator 14. However with a resistor 39 connected to a voltage 41 and the gate of FET 61, transistor 61 may turn on to run the actuator as indicated in circuit 62 of FIG. 6. Actuator 14 may be regarded as being full on with a 100 percent duty cycle.

However, a circuit 40 may be connected to resistor 39 to provide a positive voltage to turn on FET 61. A signal from a VCC pulse signal generator 40 may provide a positive signal that resembles the pulse width modulated signal 20 in graph 16 of FIG. 2, having a less than a 100 percent duty cycle, and an output current signal at FET 61 may resemble signal 22 in graph 21 of FIG. 3 rather than signal 24 in graph 23 of FIG. 4 in the latter event that resistor 39 was connected directly to VCC voltage terminal 41. Actuator 14 does not necessarily need a 100 percent duty cycle current signal. The signal from generator 40 may generally have a pulse width that results in less than 100 percent duty cycle. The pulse width may be adjustable with some generator circuit parameters. The pulse may have an amplitude between zero and VCC volts. Examples of circuit 40 may incorporate a Signetics™ NE555 timer IC, an ON Semiconductor™ RC operational amplifier and comparator, and a Microchip™ AN538 pulse width modulation module. Other circuits, such as, for example, timer circuits, analog pulse width modulation circuits and RC inverter oscillator circuits, may be used for generator 40. If the output of controller 11 on line 32 is normal, the signal on line 32 would override the signal from generator 40 since the impedance looking into the controller may be sufficiently lower than the resistance of resistor 39 and/or the impedance of generator 40. Generator 40 may be used in other fail-safe mechanisms of circuit 12 shown in the other Figures noted herein.

Figure 8:
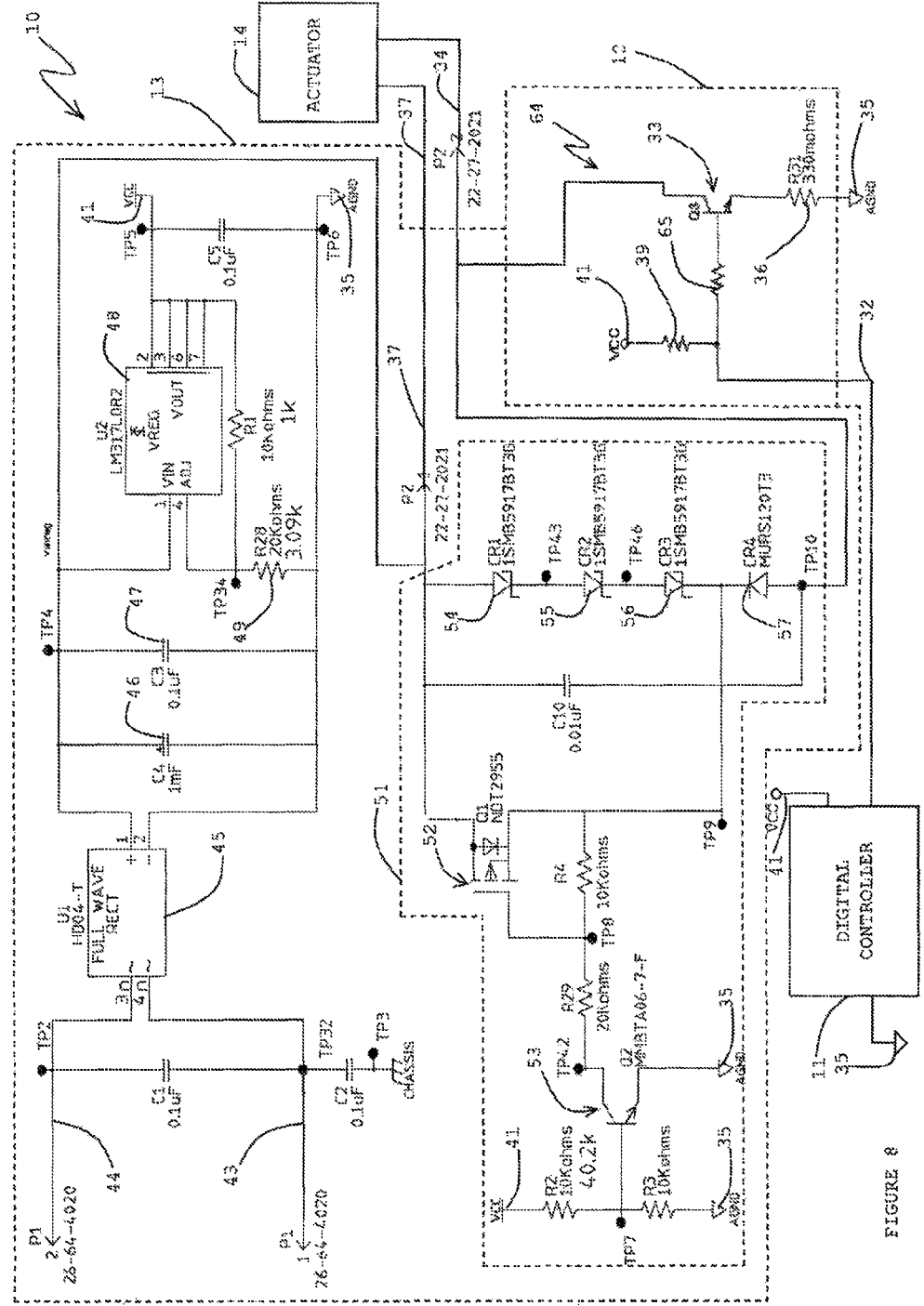

FIG. 8 appears similar to FIG. 5 in that circuit 12 may have a fail-safe switching mechanism 64 which is like the switching mechanism 31. One difference between mechanisms 31 and 64 is that mechanism 64 has a resistor 65 connected in series between line 32 from controller 11 and the base of transistor 33. Resistor 39 may be connected to voltage terminal 41 at one end and to line 32 at the other end. Operation of mechanism 64 may be similar to that of mechanism 31. In mechanisms 31 and 64, the end of resistor 39 connected to voltage terminal 41 may instead be connected to a pulse signal generator 40 like that as shown in mechanism 63 of FIG. 7.

Figure 9:
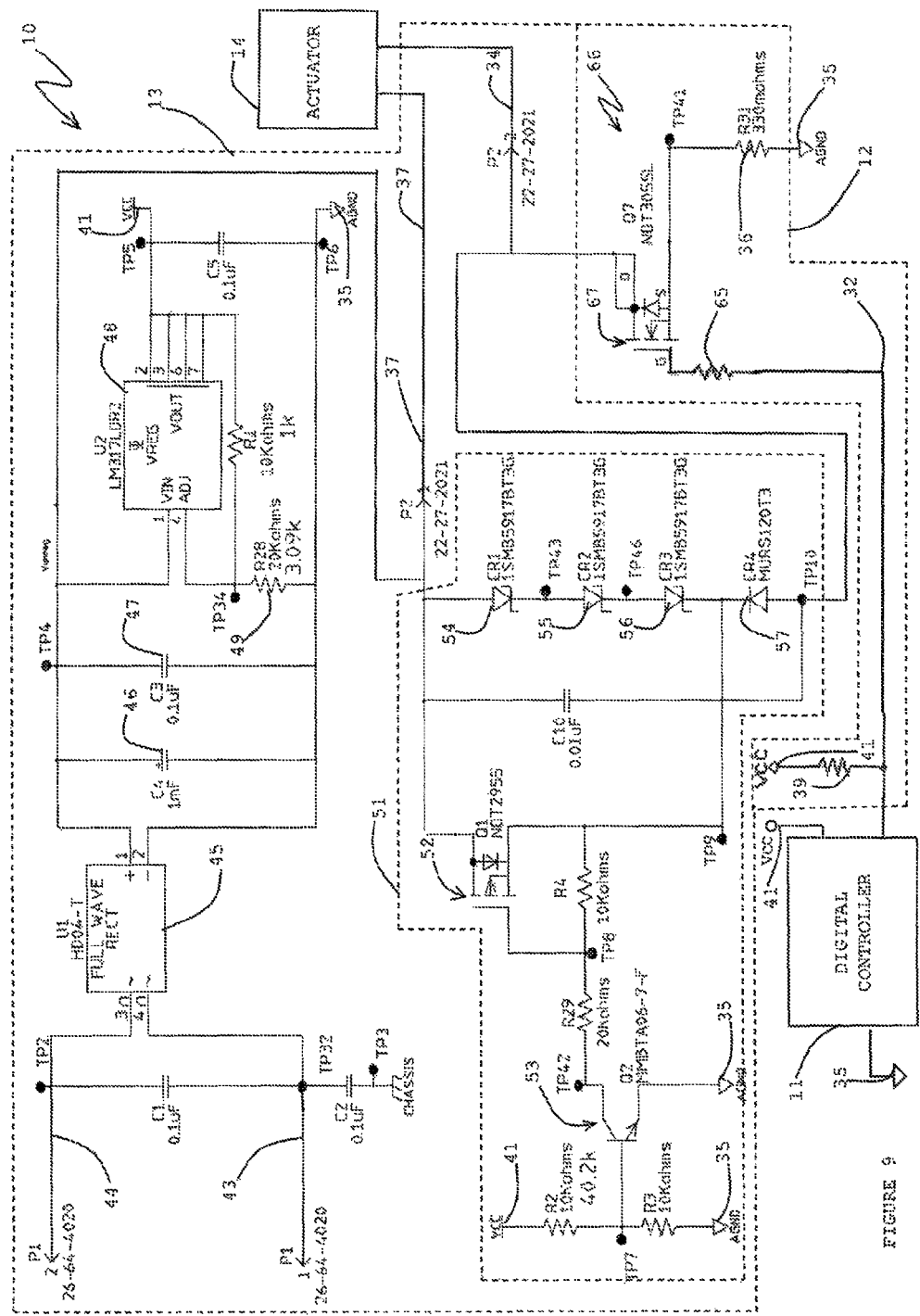

In FIG. 9, circuit 12 may have a fail-safe switching mechanism 66 which appears similar to mechanism 64 of FIG. 8. One difference between mechanisms 64 and 66 is that mechanism 66 has an N-channel FET 67 in lieu of the NPN bipolar transistor 33. The other components and circuitry of mechanism 66 may be similar to those of mechanism 64. Also, the operation of mechanism 66 may similar to that of mechanism 64. In an alternative design of mechanism 66, the end of resistor 39 connected to voltage terminal 41 may instead be connected to a pulse signal generator 40 like that as shown in mechanism 63 of FIG. 7.

Figure 10:
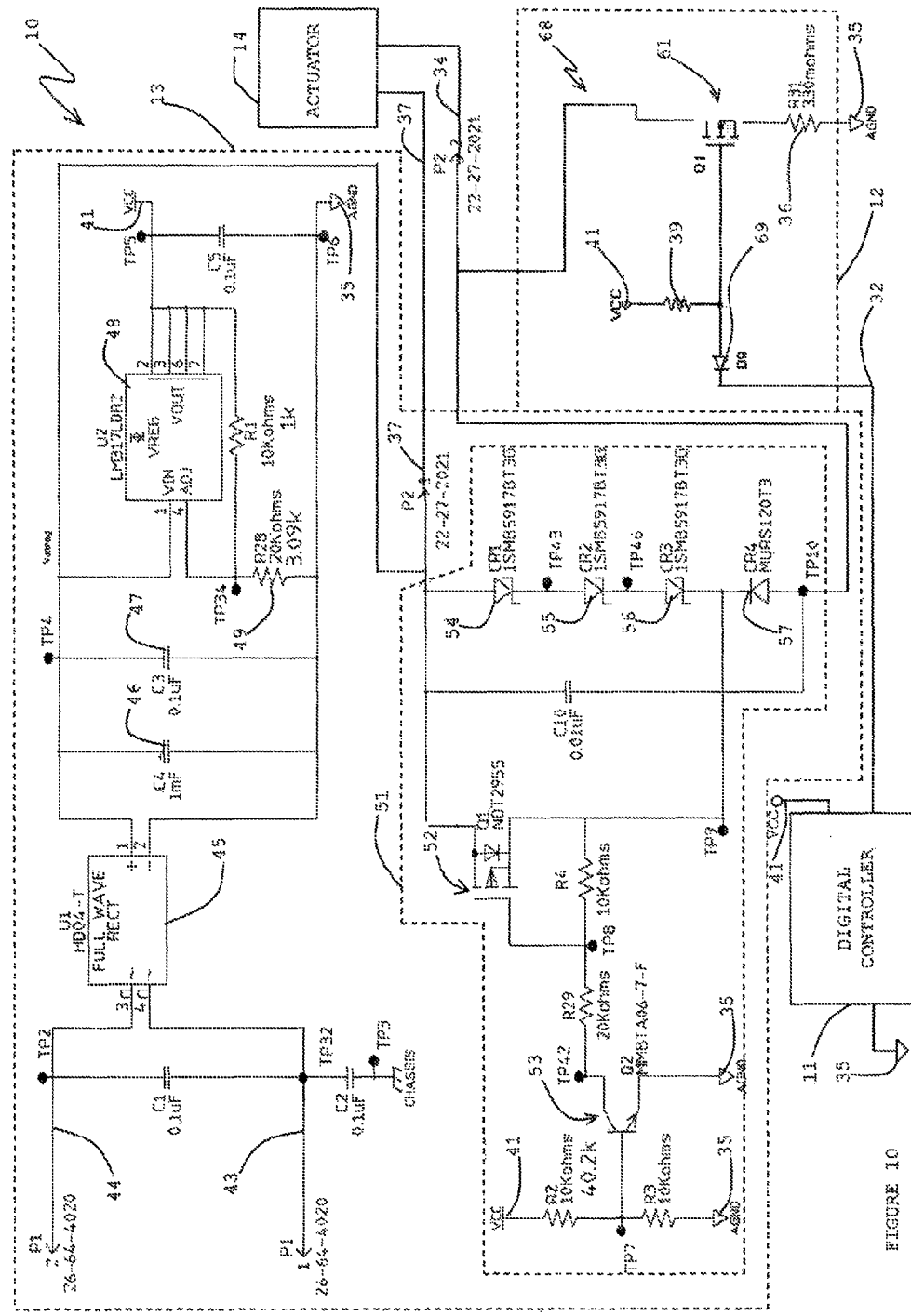

FIG. 10 appears similar to FIG. 6 in that circuit 12 may have a fail-safe switching mechanism 68 which is like switching mechanism 62. One difference between mechanisms 62 and 68 is that mechanism 68 has a diode 69 connected in series between line 32 and the gate of FET 61. Diode 69 may have a cathode connected to line 32 and an anode connected to the gate of FET 61 and to one end of resistor 39. The other end of resistor 39 may be connected to voltage terminal 41. If a pulse signal 20 from controller 11 is present on line 32, the positive pulse may be blocked by diode 69. However, the gate of FET 61 may be pulled up by resistor 39 connected to positive voltage terminal 41, thus turning on FET 61 so that current may flow through actuator 14. When the pulse signal 20 on line 32 goes to zero, then the voltage on the gate of FET 61 could be pulled down close to zero except for a 0.7 or so voltage drop across diode 69, which may still result in FET 61 being switched off. If controller 11 fails and a high impedance results on line 32, then resistor 39 connected to voltage terminal 41 may pull the voltage up on the gate of FET 61 to turn the FET so that current may flow through actuator 14.

Figure 11:
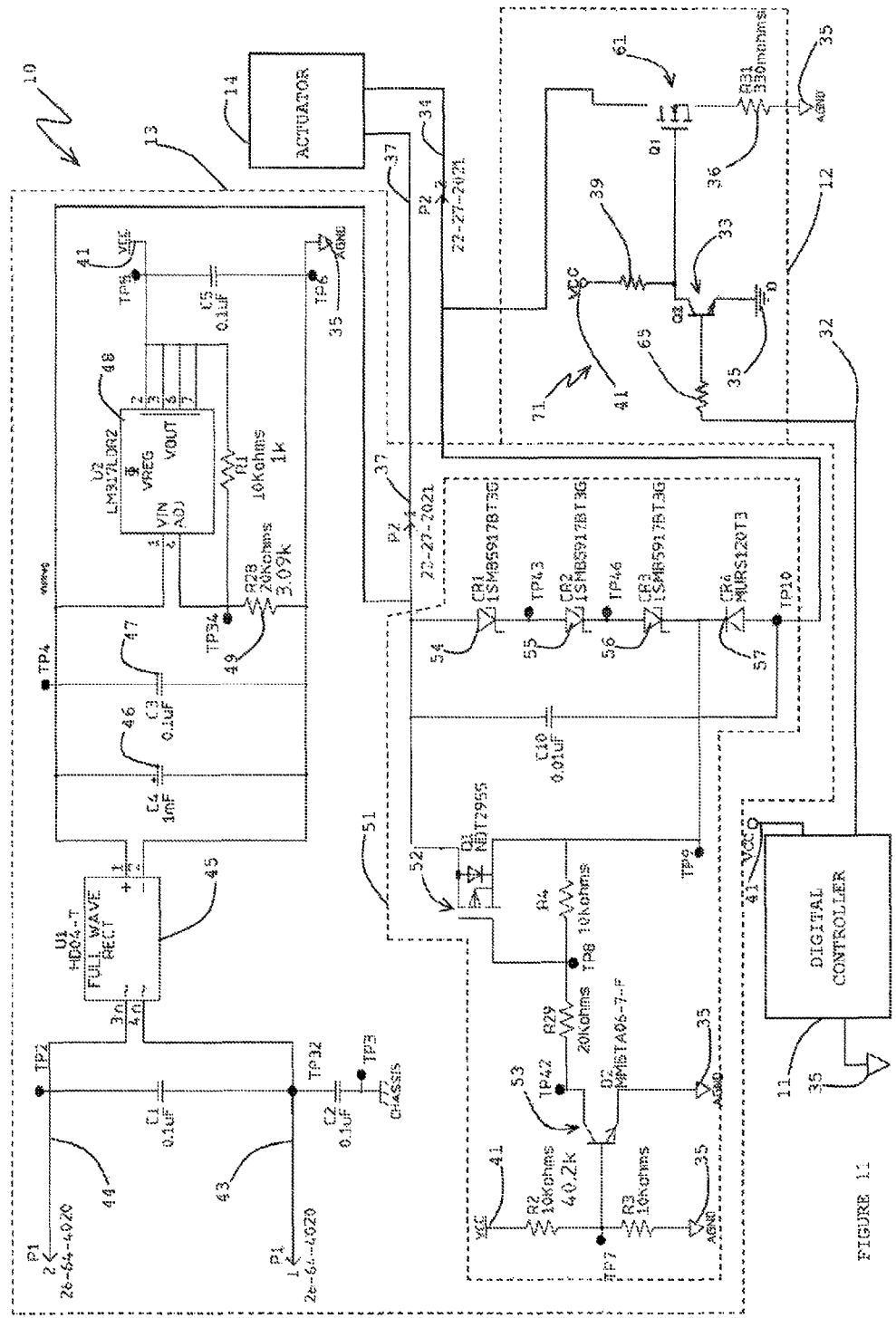

FIG. 11 may have a fail-safe switching mechanism 71. A signal 20 on line 32 from controller 11 may go via a resistor 65 to the base of an NPN transistor 33. If the pulse of signal 20 is a positive voltage, then the positive voltage on the base of transistor 33 may turn on the transistor which has a collector connected via a resistor 39 to a positive voltage at terminal 41 and an emitter connected to a ground, a negative or lower positive voltage at terminal 35. With transistor 33 being on, then current may flow through the transistor bringing the voltage at the collector down close to the voltage at terminal 35. The collector of transistor 33 may be connected to a gate of an N-channel FET 61. FET 61 may have a drain connected to line 34 which is connected to one end of a motor winding of actuator 14. The other end of the motor winding may be connected to a line 37 which is a positive terminal of unregulated power supply 13. The source of FET 61 may be connected via resistor 36 to terminal 35. Since the collector of transistor 33 is close to the voltage of terminal 35, then the gate of FET 61 may be close to the voltage at terminal 35 and thus FET 61 would not necessarily be on and no current would appear to be flowing through the FET and the motor winding of actuator 14. If the pulse of signal 20 is at about a zero or negative voltage relative to terminal 35, then signal 20 may present such voltage via resistor 65 to the base of transistor 33 which can result in the transistor being off. Then since the voltage on resistor 39 is not pulled to the potential on terminal 35 due to virtually no current flow through transistor 33, then the positive voltage on terminal 41 may be present via resistor 39 on the gate of FET 61, which in turn would result in FET 61 conducting current from positive terminal 37 of power supply 13 via the motor winding of actuator 41 to line 34, and thus through FET 61 and resistor 36 to ground 35.

However, if controller 11 fails and no signal 20 is present on line 32, then a high impedance may be present on the base of transistor 33 via resistor 65. Thus, transistor 33 may be off and the collector of the transistor be pulled up to a positive voltage via resistor 39 connected to positive voltage terminal 41. Since the base of FET 61 is connected to the collector, then the FET may be turned on thereby conducting current from terminal 37 of power supply 13 via the motor winding of actuator 14, and thus through FET 61, resistor 36 and on to terminal 35.

An alternative fail-safe mechanism 71 may incorporate a generator 40 of FIG. 7 connected to resistor 39 in the same manner as in mechanism 63.

Figure 12:
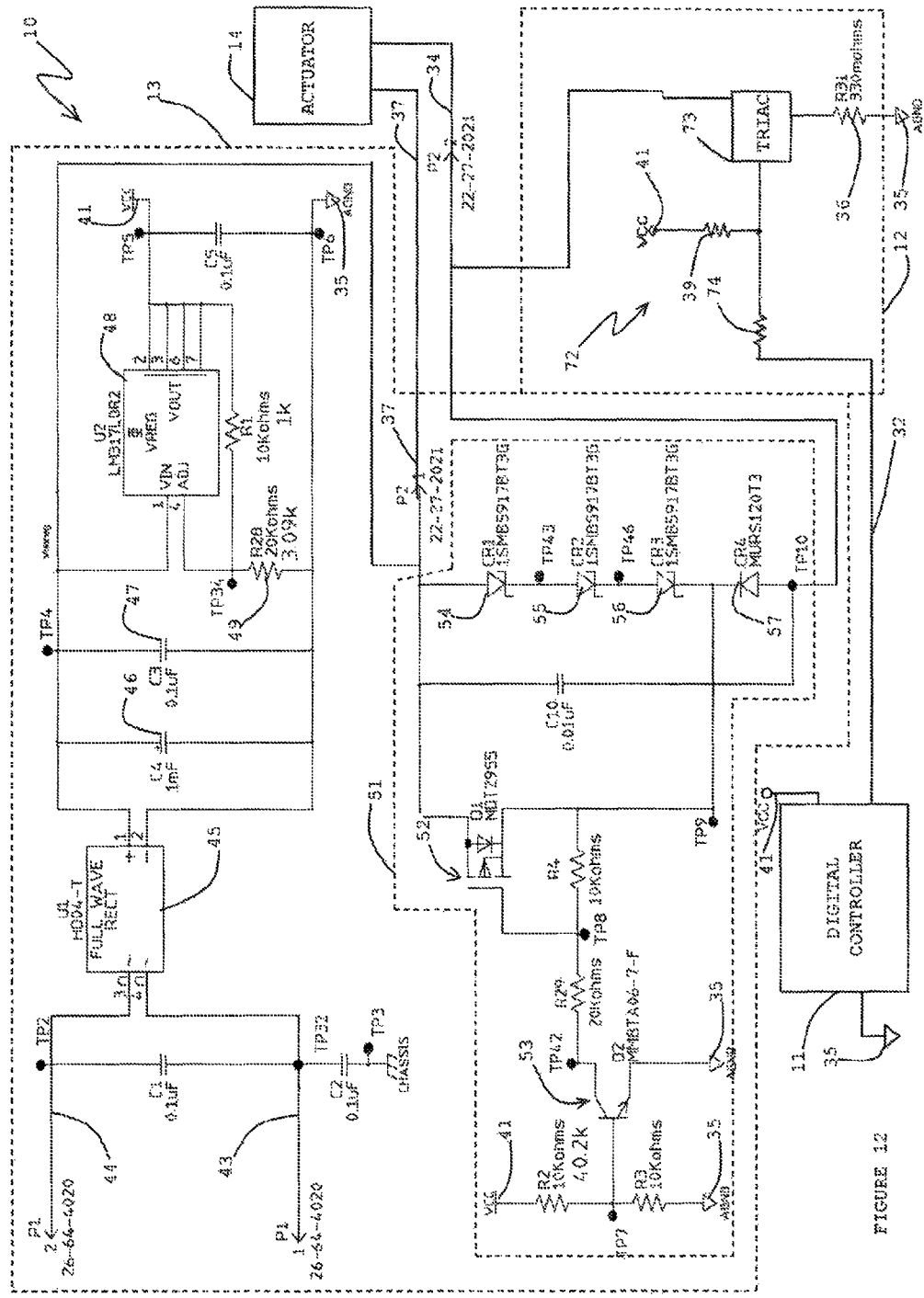

FIG. 12 shows a fail-safe mechanism 72 in circuit 12 which may have a triac 73. A signal 20 may come from controller 11 via line 32 and resistor 74 to a gate of triac 73. Triac 73, with a positive voltage pulse of signal 20 to its gate, may cause current from terminal 37 of power supply 13 via the motor winding of actuator 14, the main terminals of the triac, and resistor 36 to ground 35. A negative or zero voltage pulse may shut triac 73 off and thus not permit a flow of current through the motor winding of actuator 14, and a positive pulse may permit triac 73 to turn on again. If no signal is coming from controller 11, triac 73 may tend not to turn on. However, resistor 39 may have has one end connected to the gate of triac 73 and another end connected to positive voltage terminal 41 such that the triac is in an "on" condition so that current may continue to flow through the motor winding of actuator 14.

Figure 13:
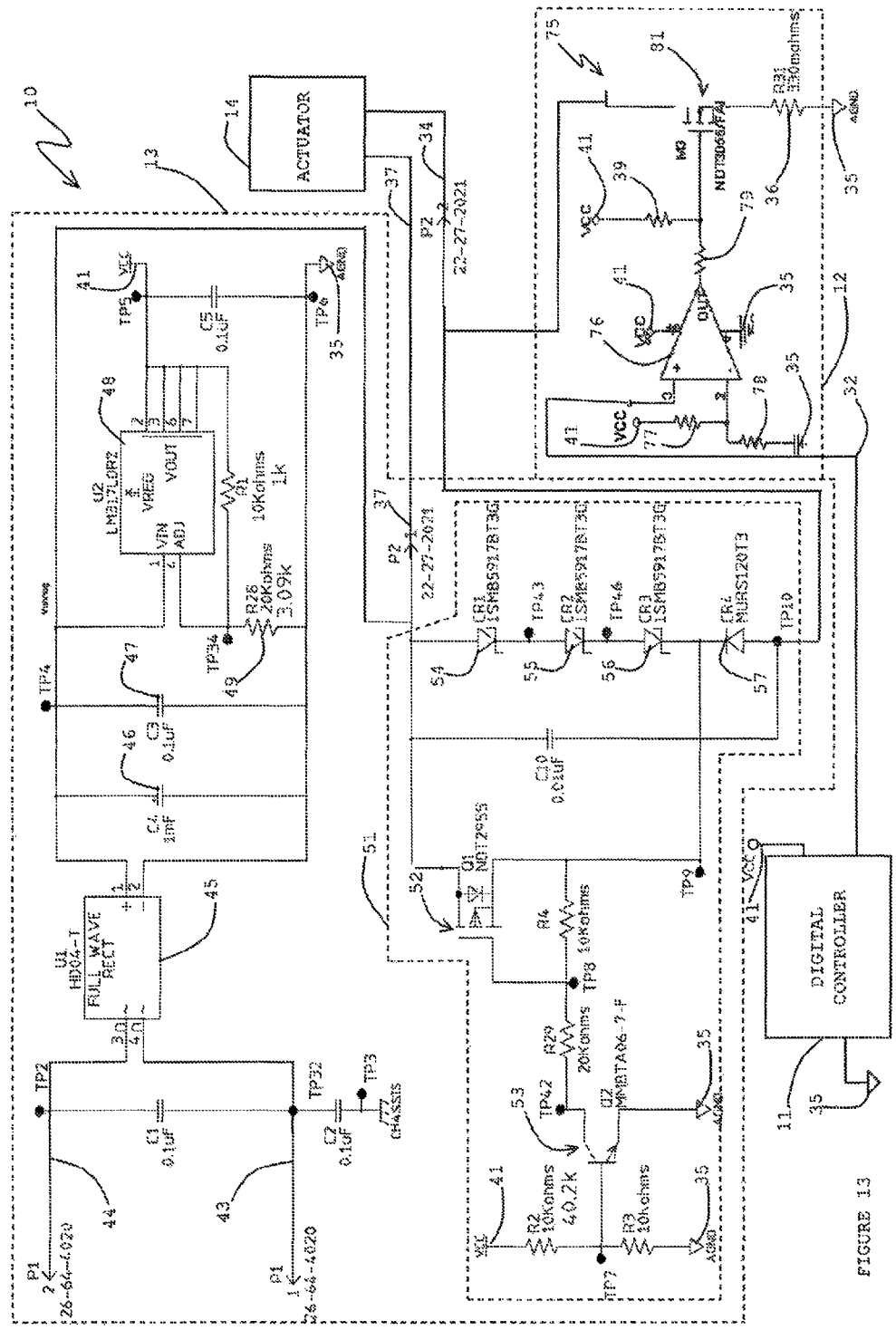

FIG. 13 shows a fail-safe mechanism 75 in circuit 12. A signal 20 may proceed from controller 11 along line 32 to a non-inverting input of an operational amplifier 76. There may be a voltage from a midpoint connection of resistors 77 and 78, with the other end of resistor 77 connected to positive voltage terminal 41 and the other end of resistor 78 connected to ground terminal 35. The midpoint connection may be connected to an inverting input of amplifier 76. Resistors 77 and 78 may be regarded as a voltage divider. A signal like that of signal 20 may be at the output of op-amp 76 and go to the gate of an N-channel FET 81 via a resistor 79. With a voltage, positive relative to terminal 35, on the gate of FET 81, the FET may turn on permitting current to flow from positive terminal 37 of power supply 13 through a motor winding of actuator 14, FET 81 and resistor 36 to the other terminal of power supply 13 regarded as terminal 35. If controller 11 fails and no signal is present on line 32 at the non-inverting input of op-amp 76, then the output at resistor 79 could be low. However, to keep FET 81 conducting current through the current path, incorporating the motor winding of actuator 14; a resistor 39 with one end connected to positive voltage terminal 41 and the other end connected to the gate of FET 81, a positive voltage may be applied to the gate to maintain a current flow through the motor winding of actuator 14. Incidentally, a signal generator 40 like that in mechanism 63 of FIG. 7 may be connected to the one end of resistor 39 in lieu of its connection to terminal 41, to provide a signal to the gate of FET 81 having a duty cycle of less than 100 percent.

Figure 14:
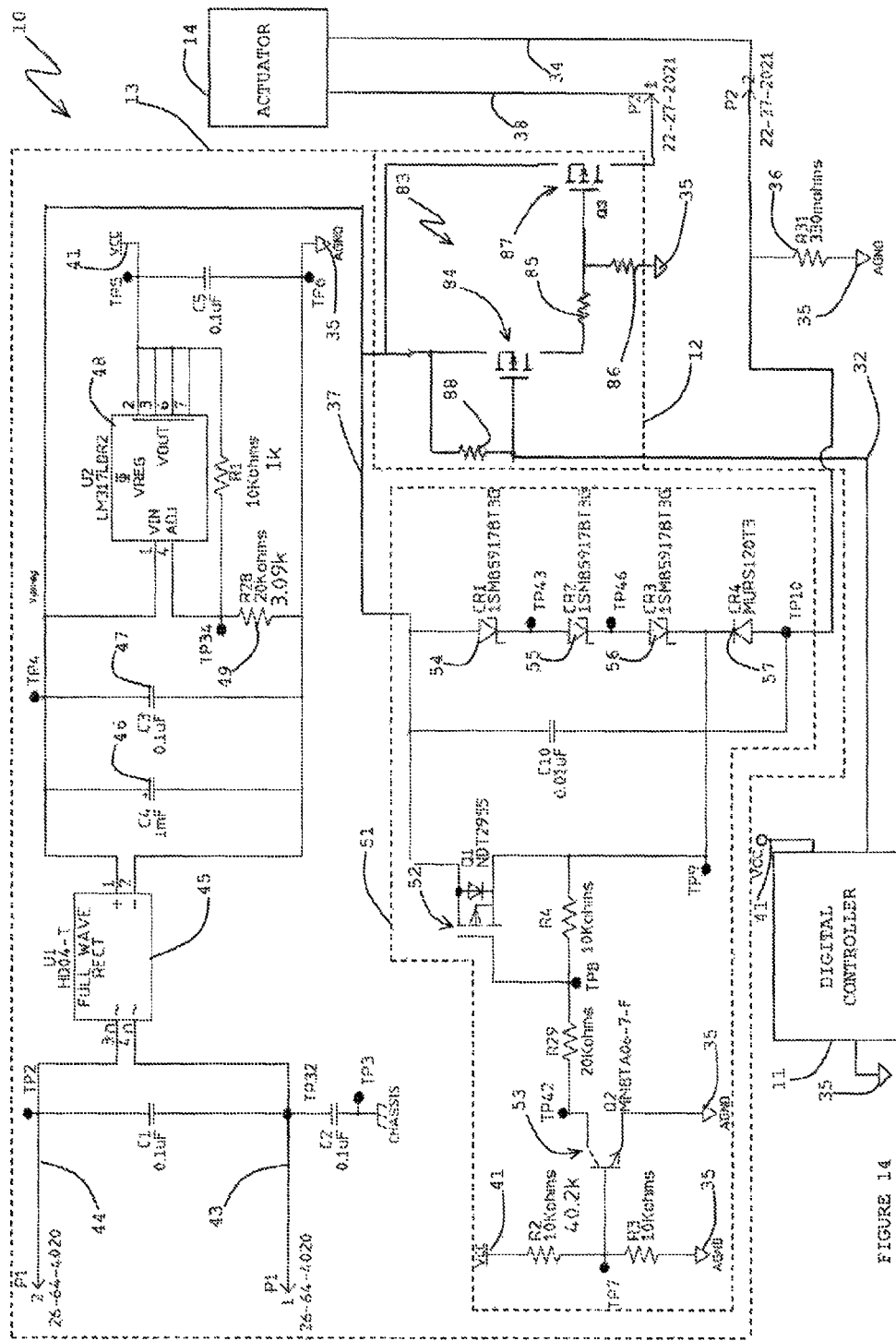

FIG. 14 shows a fail-safe mechanism 83 and in circuit 12. A signal 20 may appear on line 32 which may be connected to the gate of a P-channel FET 84. The source of FET 84 may be connected to the positive terminal 37 of power supply 13. The drain of FET 84 may be connected, via resistors 85 and 86 connected in series, to a ground or lower voltage terminal 35 of the power supply. The connection between resistors 85 and 86 may be connected to the gate of a P-channel FET 87. The source of FET 87 may be connected to positive terminal 37 of power supply 13. The drain of FET 87 may be connected to a line 38 which is connected to one end of a motor winding of actuator 14. The other end of the winding may connected to a line 34 which is connected to the other power supply terminal 35 via resistor 36. A resistor 88 may have one end connected to the gate of FET 84 and the other end connected to the positive terminal 37 of power supply 13.

Signal 20 from controller 11 may have a positive pulse on line 32 to the gate of FET 84, which may cause the FET to be off and not conduct current from the source to the drain. If FET 84 is off, then resistor 86 may pull the gate of FET 87 down to the lower voltage potential of ground terminal 35 and result in FET 87 to be on and conduct current from terminal 37 through FET 87 from the source to the drain, through line 38 and motor winding of actuator 14, and through line 34 and resistor 36 to the lower voltage or ground terminal of power supply 13.

Signal 20 from controller 11 may have a low or zero voltage level between the positive pulses of signal 20 on line 32 to the gate of FET 84. The lower voltage of signal 20 may cause FET 84 to be on and conduct current from the source to the drain. This current may flow through resistors 85 and 86 to ground. The connection of resistors 85 and 86 may be like that of a voltage divider and result in a positive or high enough voltage signal on FET 87 which would cause FET 87 to be off and not conduct current from the source to the drain, and thereby resulting in virtually no current flow through the motor winding of actuator 14.

If controller 11 fails and there is no signal 20 on line 32 to the gate of FET 84, then resistor 88 connected between the gate and the positive terminal of power supply 13 may pull the gate up to a positive potential and cause FET 84 to be off and not conduct current. This may result in the gate of FET 87 to be pulled down towards a lower or ground potential via resistor 86 since resistor 85 is effectively open at the end connected to the drain of FET 84. The low potential on the gate of FET 87 may cause the FET to be on and for current to flow from terminal 37 of power supply 13, through FET 87, line 38, the motor winding of actuator 14, line 34 and resistor 36 to the other or ground terminal 35 of power supply 13.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:
1. A power control system comprising:
a switching circuit; and
a digital controller connected to the switching circuit; and wherein:
the switching circuit controls an amount of current from a power supply to an actuator according to a control signal from the controller;
if the controller fails to provide the control signal to the switching circuit then the switching circuit controls the amount of current from the power supply to the actuator according to a default control signal; and the actuator is a component of a heating, ventilating and air conditioning system.

2. The power control system of claim 1, wherein:
the control signal comprises a digital waveform having an adjustable duty cycle;
increasing the duty cycle increases the amount of current from the power supply to the actuator; and
decreasing the duty cycle decreases the amount of current from the power supply to the actuator.

3. The power control system of claim 1, wherein:
the switching circuit comprises:
 a first terminal connected to an output terminal of the controller;
 a second terminal connected to a first connector for the power supply; and
 a third terminal connected to a first connection of the actuator; and
 a fourth terminal connected to a second connector for the power supply; and
the actuator comprises a second connection connected to the second connector for the power supply.

4. The power control system of claim 3, wherein the switching circuit further comprises:
a transistor having a first terminal connected to the first terminal of the switching circuit, a second terminal connected to the third terminal of the switching circuit, and a third terminal connected to the second terminal of the switching circuit; and
an impedance element having a first end connected to the second connector for the power supply and a second end connected to the first terminal of the transistor.

5. The power control system of claim 4, wherein:
the transistor is an NPN transistor;
the first terminal of the transistor is a base;
the second terminal of the transistor is a collector; and
the third terminal of the transistor is an emitter.

6. The power control system of claim 4, wherein:
the transistor is an N-channel FET;
the first terminal of the transistor is a gate;
the second terminal of the transistor is a drain; and
the third terminal of the transistor is a source.

7. The power control system of claim 2, wherein:
the digital waveform comprises a first level and a second level and switches from one level to the other level; and
the duty cycle of the digital waveform is a period of time at the first level divided by a period of time of one cycle of the waveform.

8. The power control system of claim 7, wherein the default signal is provided by an impedance element connected to a polarity of the power supply or an output of a signal generator.

9. The power control system of claim 8, wherein the default signal is sufficient to at least momentary in a continuous fashion turn on the transistor if the controller fails to provide the control signal to the switching circuit.

10. The power control system of claim 9, wherein the control signal overrides the default signal.

11. The power control system of claim 1, wherein:
the switching circuit comprises:
 a first terminal connected to an output terminal of the controller;
 a second terminal connected to a first connector for the power supply; and
 a third terminal connected to a first connection of the actuator;
 a fourth terminal connected to a second connector for the power supply;
 a first FET having a gate connected to the first terminal, a source connected to the second terminal and having a drain;
 a second FET having a gate, having a source connected to the second terminal and a drain connected to the first connection of the actuator;
 a first impedance element having a first end connected to the gate of the first FET and a second end connected to the second terminal;
 a second impedance element having a first end connected to the drain of the first FET and having a second end connected to the gate of the second FET;
 a third impedance element having a first end connected to the gate of the second FET and a second end connected to the fourth terminal; and
 the first and second FETs are P-channel FETs; and
the actuator comprises a second connection connected to the second connector for the power supply.

12. A method for control of power to an actuator, comprising:
varying an amount of electrical power to an actuator; and
switching the electrical power on and off from an electrical power source to the actuator to provide the varying an amount of power to the actuator; and
wherein:
the switching the electrical power is according to a control signal;
a controller outputs the control signal; and
if the controller outputs no control signal, then a default signal is provided in lieu of the control signal.

13. The method of claim 12, wherein:
the control signal has a first state and a second state;
the first state switches on the electrical power to the actuator and the second state turns off the electrical power to the actuator;
durations of the first state and the second state comprise a cycle of the control signal;
the control signal has a plurality of cycles over a duration of time;
the control signal has a duty cycle which is a duration of a first state divided by a duration of the cycle; and
the duty cycle of the control signal is varied by the controller to vary the amount of electrical power to an actuator to satisfy certain power requirements for the actuator.

14. The method of claim 13, wherein if the control signal fails to appear from the controller as a source resulting in a control signal failure, then the control signal failure causes the default signal to appear from another source in lieu of the control signal.

15. The method of claim 14, wherein the default signal comes from a voltage source and has a first state.

16. The method of claim 14, wherein the default signal comes from a signal generator that provides the default signal having a first state, a second state and a duty cycle.

17. The method of claim 12, wherein the actuator is a component of a heating, ventilating and air conditioning system.

18. A power control circuit for an actuator comprising:
an actuator;
a fail-safe bypass switching circuit connected to the actuator;
a power supply connected to the fail safe bypass switching circuit; and
a controller connected to the fail-safe bypass switching circuit; and wherein:

the actuator comprises a motor winding;

the power supply provides a power signal to the a fail-safe bypass switching circuit;

the controller provides a control signal to the fail-safe bypass switching circuit;

the fail-safe bypass switching circuit outputs the power signal having a waveform resembling a waveform of the control signal; and if the controller fails to provide a control signal, then the fail-safe bypass switching circuit provides a second control signal in lieu of the control signal from the controller.

19. The circuit of claim 18, wherein:

the control signal comprises a multi-level waveform having a variable duty cycle to control power to the actuator;

the second control signal is selected from a group of connections consisting of a connection to a polarity of the power supply and a connection to a signal generator; and the actuator is a component of a heating, ventilating and air conditioning system.

\* \* \* \* \*